June 4, 1968  A. R. STONE ETAL  3,386,322

CUT-OFF MACHINE

Filed March 21, 1966   4 Sheets-Sheet 1

INVENTORS.
ARTHUR R. STONE.
ROLAND H. FITCH.
BY D. Emmett Thompson
ATTORNEY.

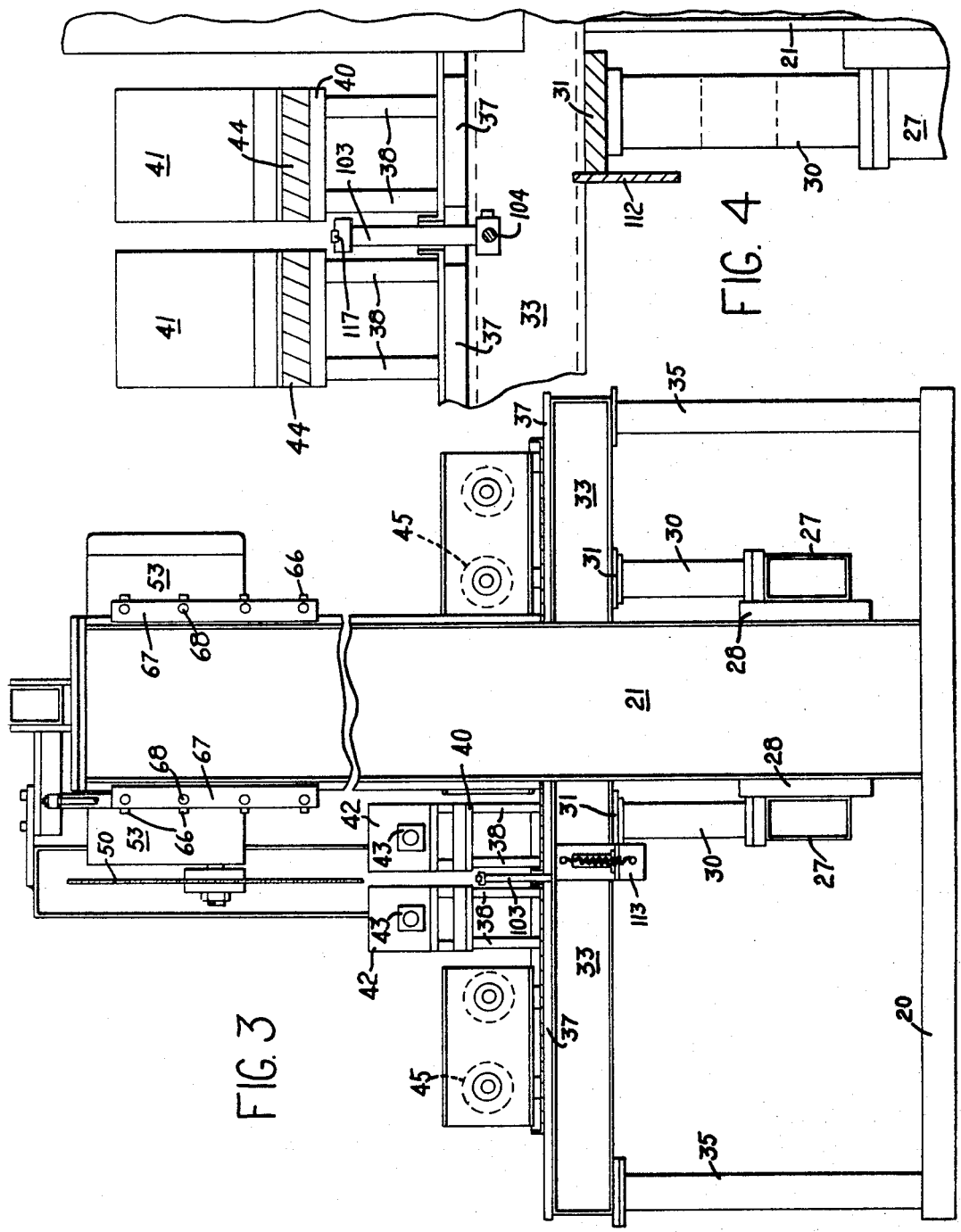

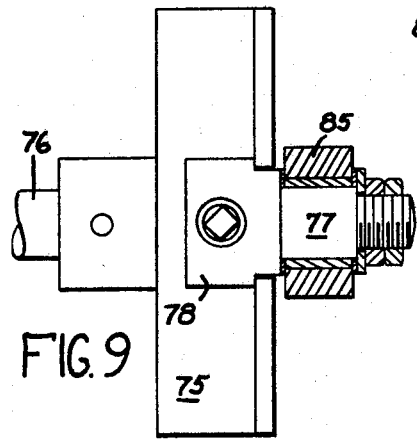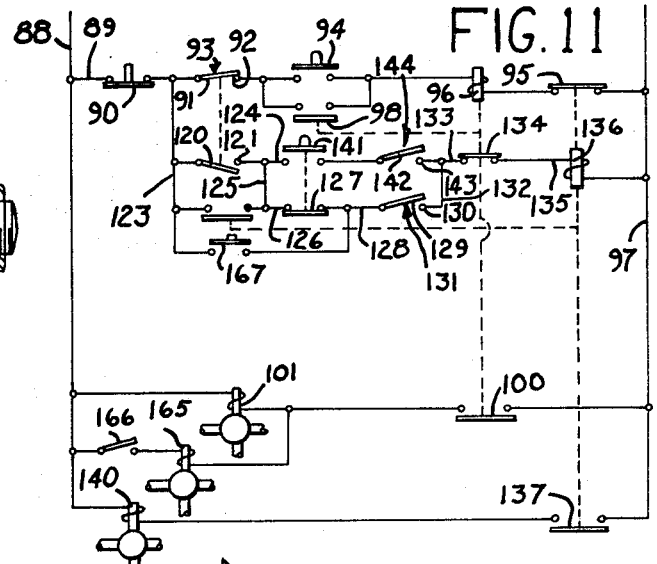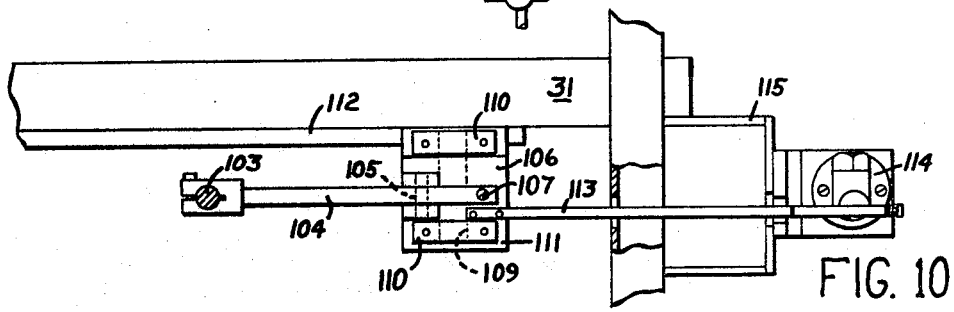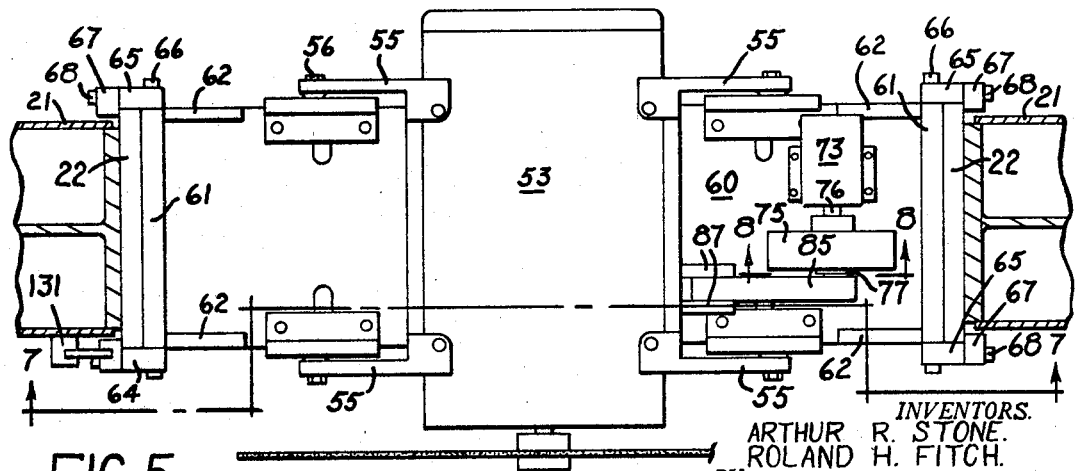

June 4, 1968  A. R. STONE ET AL  3,386,322
CUT-OFF MACHINE
Filed March 21, 1966  4 Sheets-Sheet 4
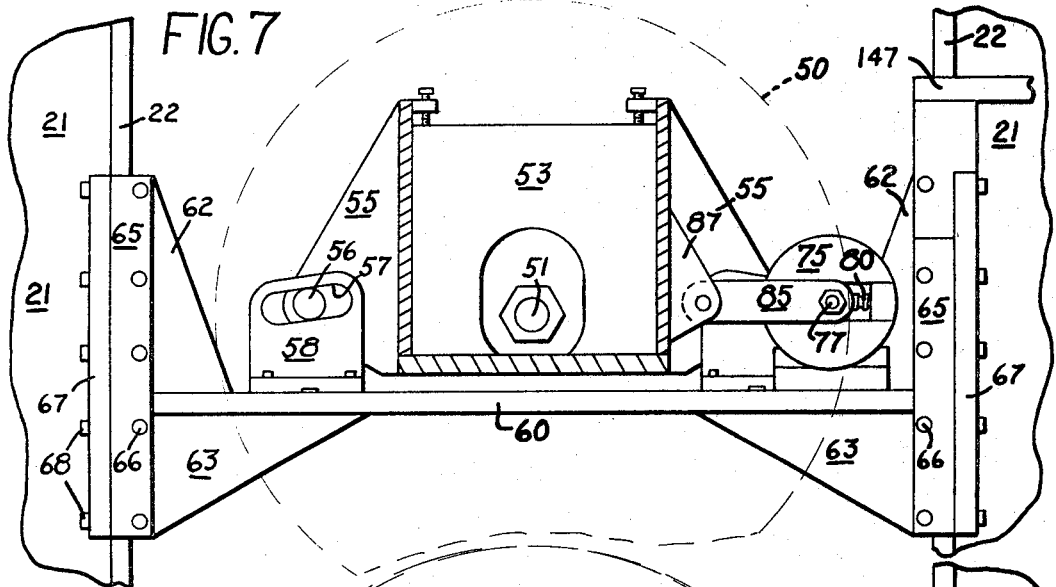
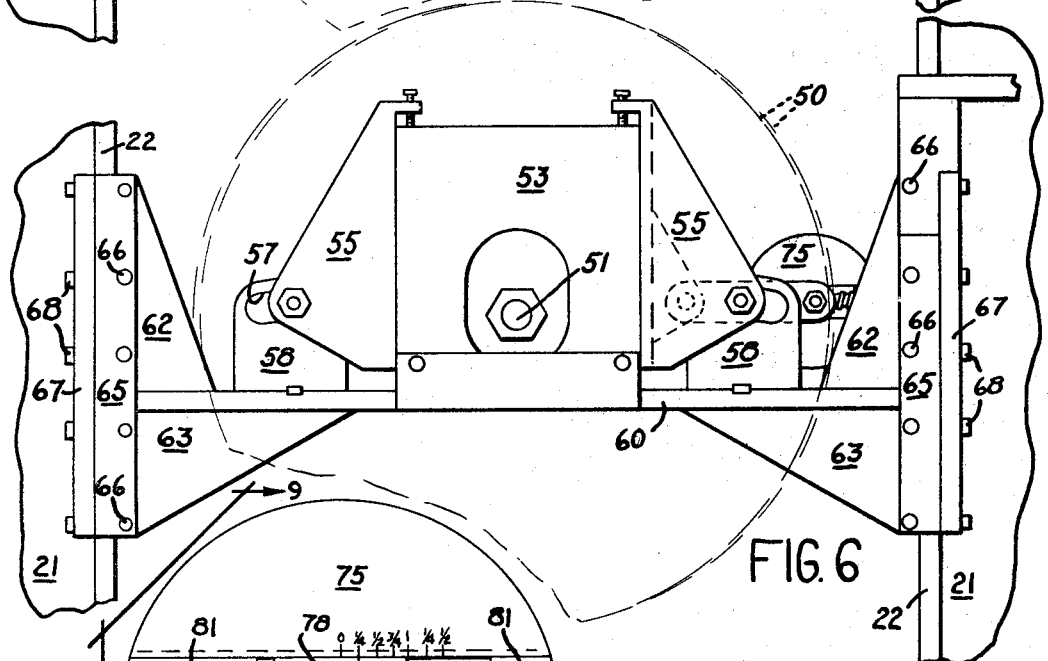
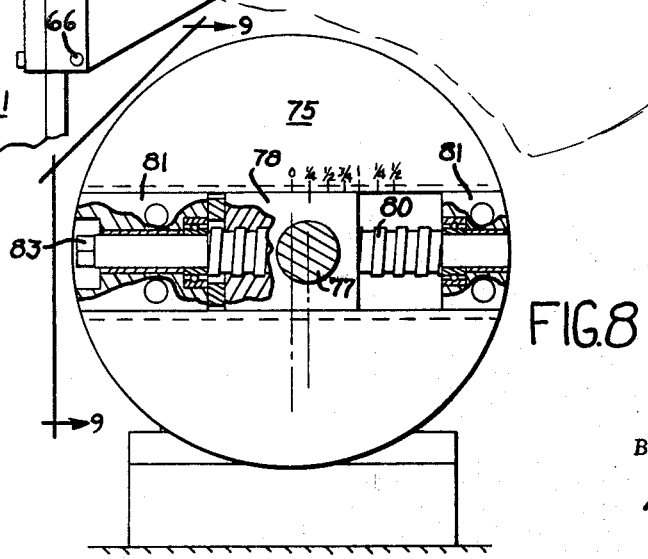
INVENTORS.
ARTHUR R. STONE.
BY ROLAND H. FITCH.
D. Emmett Thompson
ATTORNEY

United States Patent Office 3,386,322
Patented June 4, 1968

3,386,322
CUT-OFF MACHINE
Arthur R. Stone and Roland H. Fitch, Manlius, N.Y., assignors to Stone Machinery Company, Inc., Manlius, N.Y., a corporation of New York
Filed Mar. 21, 1966, Ser. No. 535,767
6 Claims. (Cl. 83—488)

ABSTRACT OF THE DISCLOSURE

The cutter wheel head is mounted on a support slidable on vertical columns, power-operated means is carried by the support and is operable during downward movement of the support and wheel head to effect repetitive reciprocation of the wheel head transversely of the work piece. Control means is provided for arresting upward movement of the cutter wheel head when the cutter wheel clears the work piece regardless of the diameter of the cutter wheel.

---

This invention relates to cut-off machines of the type employing a rotary cutter wheel, and more particularly to a machine for severing steel billets of large cross sectional area.

The invention has as an object a cut-off machine embodying a particularly heavy and rugged structural arrangement and functioning to rapidly sever work pieces.

The invention consists in the novel features and in the combinations and constructions hereinafter set forth and claimed.

In describing this invention, reference is had to the accompanying drawings in which like characters designate corresponding parts in all the views.

In the drawings—

FIGURE 3 is a side elevational view looking to the left in FIGURE 1.

FIGURE 4 is an enlarged sectional view taken on line 4—4, FIGURE 1.

FIGURE 5 is a top plan view of the cutter wheel head and support therefor, with contiguous portions of the columns in section.

FIGURE 6 is a front elevational view of the cutter wheel head looking upwardly in FIGURE 5.

FIGURE 7 is a view taken on line 7—7, FIGURE 5.

FIGURE 8 is a view taken on line 8—8, FIGURE 5, with parts broken away, and parts in section.

FIGURE 9 is a view taken on line 9—9, FIGURE 8.

FIGURE 10 is a view taken on line 10—10, FIGURE 1.

FIGURE 11 is a schematic wiring diagram of the circuitry for controlling the vertical movement of the wheel head.

Figure 1:
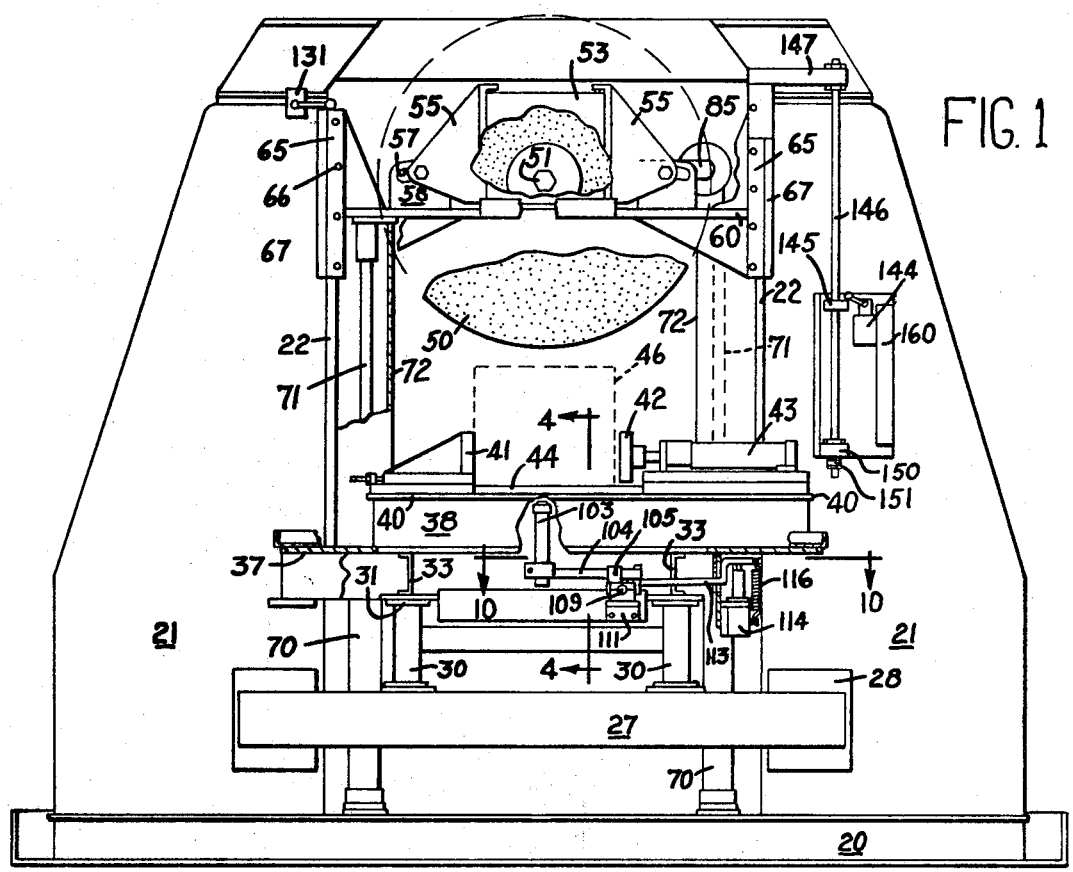
FIGURE 1 is a front end elevational view of a cut-off machine embodying our invention.
Figure 2:
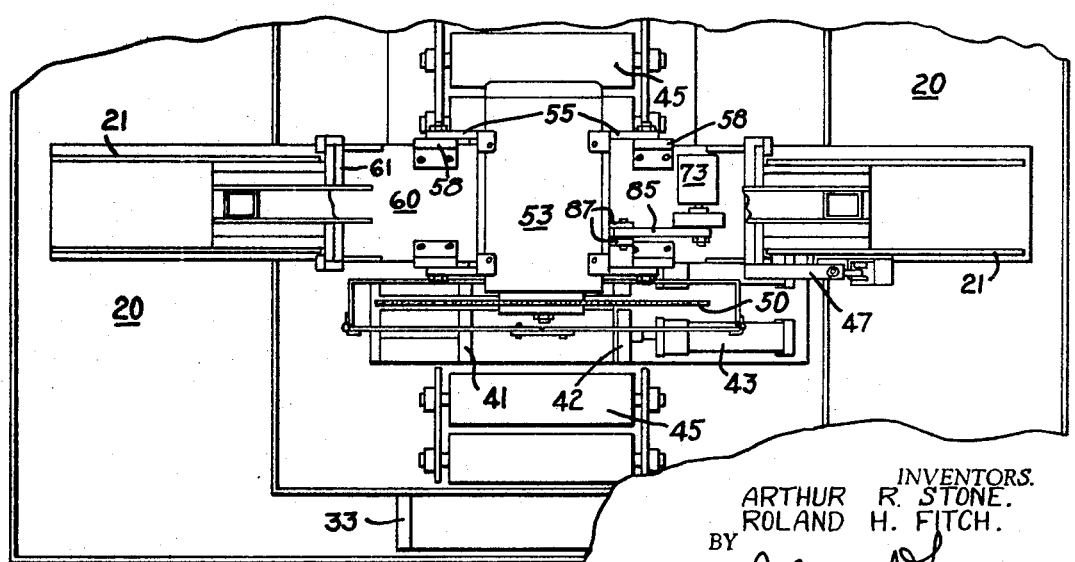
FIGURE 2 is a top plan view.

The frame of the machine includes a base member 20 and a pair of vertically disposed columns 21 extending upwardly from the base 20. The confronting inner sides of the columns 21 are provided with plates 22, the plates being slightly wider than the columns.

Cross beams 27 are provided at their ends with pads 28 fixedly secured to opposite sides of the columns 21. The beams 27 being affixed to the columns near the lower ends thereof, and span the space between the columns. Posts 30 are mounted on the cross beams 27 and support transversely extending plates 31 on which are mounted channel members 33, which extend in spaced apart parallel relation intermediate the columns 21. The outer ends of the channel members 33 are supported by posts 35 extending upwardly from the base 20, see FIGURES 1 and 3.

Plates 37 are fixed to the upper flanges of the channel members 33. Pairs of plates 38 are mounted on the plates 37 in vertical edgewise position, and also extending transversely of the channel members 33. Plates 40 are fixed to the upper edges of each of the pair of plates 38. A work clamping structure is fixedly secured to each of the plates 40. Each work clamping structure includes a fixed jaw 41, which may be fixedly adjusted toward and from the vertical plane extending midway between the columns 21. Movable clamping jaws 42, actuated by cylinders 43, are mounted on the plates 40 in confronting relation to the fixed jaws 41. This arrangement serves to clamp the work piece in position to be operated upon by the circular cutter. The clamped work piece is positioned on wear plates 44 positioned on plates 40 intermediate the clamping members. Also mounted on the plates 37 are roller conveyors 45. These extend from opposite sides of the columns 41 and serve to support the work piece, such as a steel billet, indicated in dotted outline at 46, FIGURE 1, and provide for the convenient axial movement of the billet into position between the clamping jaws 41, 42.

The cutter wheel is indicated at 50. It is fixedly secured to an arbor 51 journalled in a wheel head 53. The wheel head 53 includes a driving motor operatively connected to the arbor 51 to effect rotation thereof. The wheel head is provided with a pair of laterally extending brackets 55 on opposite sides. The brackets 55 are provided with inwardly extending trunnions 56, the inner ends of which extend into slots 57 formed in blocks 58 fixedly secured to a supporting cross plate 60.

A vertically extending flange 61 is fixedly secured to each end of the supporting member 60, this joinder being reinforced by gussets 62 and 63. The flanges 61 have sliding engagement with the plates 22 carried by the columns 21. Vertically disposed bars 65 are fixedly secured to the vertical side edges of the flanges 61, as by screws 66. The bars 65 have close sliding engagement with the edges of the plates 22. Gibs 67 engaging the rear, or outer sides, of the plates 22, are fixed to bars 65 by screws 68. In this manner, the wheel head support structure is movable vertically on the columns 21 toward and from the work piece clamping structures. This movement is effected by a fluid operated piston and cylinder structure. The vertically disposed cylinders are indicated at 70, FIGURE 1. The piston rods 71 are connected at their upper ends to the supporting plate 60. Fluid admitted to the upper ends of the cylinders 70 feed the cutter wheel downwardly through the work piece 46. Fluid admitted to the lower ends of the cylinders 70, return the cutter wheel head to the up position shown in FIGURES 1 and 3.

The piston rods 71 may be enclosed by collapsible boots 72. Means is provided for imparting reciprocation to the wheel head 53 in a direction transverse of the work piece 46. This means consists of a motor 73 mounted on the supporting plate 60, see FIGURE 5. A crank disk 75 is fixed to the output shaft 76 of the motor 73, and is provided with a crank pin 77.

The crank pin 77 is formed with a T-shaped head portion 78, FIGURE 9, slidably mounted in a T slot extending diametrically across the face of the disk 75. The head portion 78 is formed with a threaded bore to receive a screw 80 extending in a direction diametrically of the disk 75, and being journalled at its ends in bearing blocks 81, FIGURE 8. One end of the screw 80 is provided with a non-circular portion 83 to receive a wrench for rotating the screw 80. A connecting rod 85 is connected at one end to the crank pin 77 and is pivotally connected at its opposite end to brackets 87 fixedly secured to the wheel mount 53. By rotating the screw 80, the crank pin 77 may be offset from the axis of the shaft 76 to vary the stroke imparted to the wheel head 53. In this manner, the mechanism described imparts reciprocation to the wheel head 53, this being permitted by the movement of the trunnions 56 in the slots 57 of blocks 58. The slots 57, see FIGURE 7, incline upwardly toward the wheel head 53. Accordingly, upon reciprocation of the wheel head, the latter is caused to move in an arcuate path.

The motor 73 is energized during downward movement of the wheel head—that is, during severance of the work piece 46 by the wheel 50. The movement so imparted to the wheel head has been found to result in faster cutting by the wheel 50, and to prolong the life of the wheel.

Referring to FIGURE 11, closing the contacts of switch 94 provides a circuit from the power supply 88, through wire 89, closed contacts of switch 90, closed contacts 91, 92, of switch 93, closed contacts of switch 94, closed contacts 95, relay 96, to the side 97. The contacts of switch 94 are shunted by contacts 98 of relay 96 to provide a hold circuit for the relay. Now closed contacts 100 of relay 96 provide power from the side 88, through solenoid 101, to the side 97. Solenoid 101, when energized, opens a valve to provide fluid to the upper ends of the cylinders 70, and to exhaust fluid from the lower ends of the cylinders. This effects downward movement of the wheel head to move the cutter wheel 50 through the work piece.

When the cutter wheel has severed the work piece, it engages a member 103 which is disposed between the pairs of plates 38, FIGURE 4. The member 103 is adjustably mounted on the end of an arm 104, see FIGURES 1 and 10. The arm 104 is pivotally mounted, as at 105, on a plate 106, FIGURE 10, the arm 104 being adjustable about the pivot by screw 107. The plate 106, in turn, is pivotally mounted at 109 in bearing blocks 110 mounted on an angle bracket 111 fixed to a plate 112 secured to one of the cross plates 31.

As seen in FIGURE 11, fixed to the plate 106 and extending therefrom in the opposite direction from the arm 104, is an arm 113, the outer end of which is connected to an actuator for contact 91 of the switch 93, which is mounted in an enclosure 114 fixed to a bracket structure 115 which, in turn, is fixed to the frame of the machine, see FIGURES 1 and 10. The member 103 is maintained in up position by tension spring 116 acting on the free end of the arm 113, see FIGURE 1. Preferably, the upper end of the member 103 is provided with a piece of hard material 117, FIGURE 4, such as tungsten carbide, to minimize wear upon contact with wheel 50, which is only momentary.

When contact 91 of switch 93 is moved out of engagement with contact 92 by the cutter wheel engaging the member 103, relay 96 is de-energized, causing contacts 100 to de-energize solenoid 101.

Switch 93 is provided with a contact 120 operable in unison with contact 91. When contact 91 is moved out of engagement with contact 92, contact 120 is moved into engagement with contact 121. This establishes a circuit from side 88, through wire 89, switch 90, wire 123, contacts 120, 121, wires 124, 125, 126, closed switched contacts 127, wire 128, closed contacts 129, 130, of a switch 131, wires 132, 133, closed contacts 134, of de-energized relay 96, through wire 135, relay 136, to the side 97. Closed contacts 137, of relay 136, establishes a circuit through solenoid valve 140 to exhaust fluid from the tops of the cylinders 70, and apply fluid pressure to the lower ends thereof to effect upward return movement to the wheel head. When the wheel head reaches the uppermost position, it opens the contacts of switch 131, de-energizing relay 136, and opening the contacts 137 thereof to de-energize the solenoid 140.

Switch contacts 127 are associated with switch contacts 141. When the contacts 127 are opened and contacts 141 are closed, the relay 136 is operated upon the closure of contacts 120, 121, through closed contacts 142, 143, of a switch 144 fixedly mounted on one of the columns 21, see FIGURE 1. This switch 144 is connected in parallel with the switch 131 and forms part of the control mechanism for limiting the upward return movement of the wheel head to a position where the lower edge of the cutting wheel 50 is located immediately above the top edge of the work piece 46.

The switch 144 is operated by an actuating collar 145 frictionally engaging a rod 146, the upper end of which is fixedly secured in a bracket 147 connected to the wheel head supporting structure, whereby the rod 146 is reciprocated vertically together with the wheel head supporting structure. There is a stop member 150 also fixedly secured to the column 21 and threaded to receive a bushing 151 apertured to slidably receive the rod 146. By the threaded connection, the bushing 151 may be adjusted axially of the rod 146.

When the wheel head has been moved downwardly for the severance of the work piece, the collar 145 engages the bushing 151 and, if there is further downward movement of the wheel head until the cutter wheel 50 engages the member 143, the rod 146 will slide downwardly through the now stopped collar 145. Upon the wheel 50 engaging the member 103 to actuate the switch 93 for the return movement of the wheel head, the collar 145, with its frictional engagement to the rod 146, will move upwardly engaging the actuator of switch 144 to open the contacts 142, 143, and arrest further upward movement of the wheel head.

The switch 144 is adjustable vertically on a member 160 fixed to the column 21. The switch 144 is adjusted upwardly from the stop bushing 151 a distance so that upon upward movement of the collar 145, the switch 144 will be actuated when the peripheral face of the cutting wheel 50 is just immediately above the top surface of the work piece. In other words, the switch 144 is adjusted on the member 160 comparable to the thickness of the work piece.

As the diameter of the cutter wheel 50 is decreased by wear, it is obvious that the wheel head will have to descend to a lower position in order to sever the work piece and engage the actuator 103. This further downward movement will automatically re-position the collar 145 on the rod 146 to effect return movement of the cutter wheel to a position immediately above the top side of the work piece.

This arrangement increases the operating speed of the machine and accordingly, the productive output by avoiding the consumption of time of returning the wheel head to its uppermost position before taking each cut. It will be apparent that the arrangement described functions to automatically return the wheel head, after each cutting operation, to a position where the periphery of the wheel is just immediately above the top side of the work piece. This effects a saving in time in the descent of the wheel after the switch 94 is closed to start a new cut. This arrangement is particularly advantageous when billets of small cross-sectional area are being cut on the machine.

The motor 73 may be operated continuously with the motor powering the wheel head, or the control 165, FIGURE 11, may be connected in parallel with the solenoid 101, through a switch 166. Also, the wheel head may be returned to up position by the manually operable switch 167 connected in parallel with the switch contacts 120, 121, and switch 127.

What we claim is:

1. A cut-off machine comprising a frame including a base and a pair of columns extending vertically from the base in spaced apart parallel relation, a work support fixedly mounted in the frame intermediate said columns, a cutter head support mounted on said columns for vertical movement thereon toward and from said work support, a cutter head, a cutter wheel arbor journalled in said head, a cutter wheel fixed to said arbor and motor means for effecting rotation of said arbor and cutter wheel, said cutter head being mounted on said cutter head support for limited reciprocating movement in a direction transversely of a work piece mounted on said work support, a reversible power feed means operatively connected to said cutter head support for moving the same downwardly and moving said cutter wheel from up position above the work piece downwardly through the work piece to sever the same, control means operable upon severance of the work piece to reverse said power feed means to return said cutter wheel above the work piece, and power-operated reciprocating means carried by said cutter head support and operable during downward movement of said cutter head to effect repetitive reciprocation of said cutter head transversely of the work piece.

2. A cut-off machine as defined in claim 1, including means for guiding said wheel head in an arcuate path during reciprocation thereof.

3. A cut-off machine as set forth in claim 1, wherein said control means includes a member positioned below the work piece for engagement by the cutter wheel upon severance of the work piece.

4. A cut-off machine as set forth in claim 1, wherein said power-operated reciprocating means carried by the wheel head support includes means operable to vary the magnitude of the reciprocation of said wheel head.

5. A cut-off machine as set forth in claim 1, and including a limit switch operable when actuated to de-energize said power feed means when said cutter wheel is returned to a position immediately above the work piece, a vertically disposed rod fixed to said wheel head support, a switch actuator carried by said rod and having frictional engagement therewith, and a fixed stop for engagement by said switch actuator upon severance of the work piece.

6. A cut-off machine as set forth in claim 1, wherein said control means includes a rod fixed at its upper end to said head suport and depending therefrom, a switch mounted on the frame and adjustable thereon in a direction lengthwise of said rod for operation when actuated to deenergize said power feed means when said cutter wheel is returned to a position immediately above the work piece, a switch actuator carried by said rod and having frictional engagement therewith, and a fixed stop mounted on said frame for engagement by said actuator upon severance of the work piece by said cutter wheel.

References Cited
UNITED STATES PATENTS

| | | | |
|---|---|---|---|
| 2,365,987 | 12/1944 | Zimmerman | 83—487 X |
| 2,801,458 | 8/1957 | Remmen | 83—490 X |

WILLIAM S. LAWSON, *Primary Examiner.*